(12) United States Patent
Morikawa et al.

(10) Patent No.: US 9,445,607 B2
(45) Date of Patent: Sep. 20, 2016

(54) SHUTTER DEVICE AND METHOD FOR PRODUCING ENCRUSTED FOODS

(75) Inventors: Michio Morikawa, Tochigi (JP); Kazuhide Nanahara, Tochigi (JP); Yasunori Kondo, Tochigi (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 104 days.

(21) Appl. No.: 14/117,442

(22) PCT Filed: Jul. 23, 2012

(86) PCT No.: PCT/JP2012/068557
§ 371 (c)(1),
(2), (4) Date: Nov. 13, 2013

(87) PCT Pub. No.: WO2013/015234
PCT Pub. Date: Jan. 31, 2013

(65) Prior Publication Data
US 2014/0287113 A1    Sep. 25, 2014

(30) Foreign Application Priority Data

Jul. 26, 2011 (JP) .................................. 2011-163143
Feb. 7, 2012 (JP) .................................. 2012-023883

(51) Int. Cl.
A21D 13/00 (2006.01)
A21D 8/02 (2006.01)
(Continued)

(52) U.S. Cl.
CPC ................ *A21D 8/02* (2013.01); *A21C 9/063* (2013.01); *A23L 1/007* (2013.01); *A23P 1/086* (2013.01)

(58) Field of Classification Search
USPC ........................................ 426/283, 279, 297
See application file for complete search history.

(56) References Cited

U.S. PATENT DOCUMENTS 4,671,759 A    6/1987    Hayashi et al.
5,558,896 A    9/1996    Kobayashi
(Continued)

FOREIGN PATENT DOCUMENTS

CN    85107925    4/1986
CN    1059832    4/1992
(Continued)

OTHER PUBLICATIONS

U.S. Appl. No. 14/117,509 to Michio Morikawa et al., filed Nov. 13, 2013.
(Continued)

*Primary Examiner* — Lien T Tran
(74) *Attorney, Agent, or Firm* — Greenblum & Bernstein, P.L.C.

(57) ABSTRACT

A production method for an encrusted food in that filling is encrusted with dough is comprised of: disposing a plurality of shutter pieces on a flange having an opening, each of which has a pressure face facing the opening; transporting the dough onto the flange; by a linkage, driving the shutter pieces synchronously to press the pressure faces on a periphery portion of the dough; pressing the dough on the flange against a nozzle so as to catch the periphery portion of the dough between the flange and a shoulder of the nozzle and squeeze the periphery portion of the dough into a gap between an outer periphery of the nozzle and the pressure faces; expelling the filling through the nozzle onto the dough on the flange to bulge the dough out of the opening; detaching the dough from the nozzle; and gathering the periphery portion by the pressure faces.

4 Claims, 13 Drawing Sheets

(51) Int. Cl.
  *A23L 1/00* (2006.01)
  *A21C 9/06* (2006.01)
  *A23P 1/08* (2006.01)

(56) References Cited

U.S. PATENT DOCUMENTS

| 5,967,025 | A | 10/1999 | Tashiro |
| 2003/0190391 | A1 | 10/2003 | Kobayashi et al. |
| 2005/0042350 | A1 | 2/2005 | Kobayashi et al. |

FOREIGN PATENT DOCUMENTS

| CN | 2181805 | 11/1994 |
| CN | 1113646 | 12/1995 |
| EP | 1380211 | 1/2004 |
| JP | 3016246 | 3/2000 |
| JP | 2002-306149 | 10/2002 |
| JP | 3421668 | 6/2003 |
| JP | 2004-329177 | 11/2004 |
| JP | 3587453 | 11/2004 |
| JP | 3811786 | 8/2006 |
| JP | 4045313 | 2/2008 |
| JP | 4045320 | 2/2008 |
| JP | 2008-178391 | 8/2008 |
| JP | 2008-259520 | 10/2008 |
| JP | 4210779 | 1/2009 |

OTHER PUBLICATIONS

International Search Report, mail date is Oct. 9, 2012.
Office Action issued in Japan Counterpart Patent Appl. No. 2015-106306, and English language translation thereof, dated Apr. 21, 2016.

SHUTTER DEVICE AND METHOD FOR PRODUCING ENCRUSTED FOODS

TECHNICAL FIELD

The present invention relates to a shutter device or a production device including the shutter device for producing encrusted foods such as Chinese meat buns, and a method for producing the encrusted foods.

BACKGROUND ART

Encrusted foods are foods in that any filling such as bean jam or minced meet is encrusted with dough such as bread dough or shortcrust. Chinese meat buns, bean-jam buns, filled doughnuts, and meat pies can be taken as examples of such encrusted foods.

Many encrusted foods are now produced in automated processes. The Patent Literatures 1,2 disclose production devices and methods for encrusted foods. According to these arts, a proper amount of filling is placed on dough that has been once rolled out into a flat shape, and peripheries of the dough are gathered by a shutter so that the filling is encrusted with and wrapped in the dough.

CITATION LIST

Patent Literature

[PTL 1]: Japanese Patent Application Laid-open No. 2008-259520
[PTL 2]: Japanese Patent Application Laid-open No. 2008-178391

DISCLOSURE OF INVENTION

As being understood from the above discussion, in an encrusted food automatically produced by the prior art, a top portion of a crust is made from gathered peripheries of dough. Even if the rolled dough before gathering has a uniform thickness, the gathered portion is built up to be thicker. The top portion of the crust, therefore, necessarily gets thicker than other portions of the crust and also protrudes upward to form a relatively large sealing portion. Such a shape may be, depending on types of encrusted foods, not preferable in view of aesthetic quality, texture or eating quality. More specifically, some problems to be solved must be left in such production devices and production methods.

The present invention has been achieved in light of the aforementioned problems and is intended to provide a production device and a production method which enable reduction in size of a sealing portion projecting from a top portion of a crust of an encrusted food.

According to an aspect of the present invention, a production method for an encrusted food in that filling is encrusted with dough is comprised of: disposing a plurality of shutter pieces on a flange having an opening into which the dough loaded with the filling is capable of sinking down so as to encircle the opening, each of the shutter pieces having a pressure face facing the opening; transporting the dough onto the flange; by a linkage, driving the shutter pieces synchronously to press the pressure faces on a periphery portion of the dough so as to make the dough sink down into the opening and leave a controlled portion of the dough on the flange; pressing the dough on the flange against a nozzle so as to catch the periphery portion of the dough between the flange and a shoulder of the nozzle and squeeze the periphery portion of the dough into a gap between an outer periphery of the nozzle and the pressure faces; expelling the filling through the nozzle onto the dough on the flange to bulge the dough out of the opening; detaching the dough from the nozzle; and gathering the periphery portion by the pressure faces.

According to another aspect of the present invention, a production device for an encrusted food in that filling is encrusted with dough is comprised of: a flange having an opening into which the dough loaded with the filling is capable of sinking down, the flange being so structured as to support the dough; a conveyor configured to transport the dough onto the flange; a plurality of shutter pieces disposed on the flange so as to encircle the opening, each of the shutter pieces having a pressure face facing the opening; a linkage configured to drive the shutter pieces synchronously to direct the pressure faces toward the opening; and a nozzle configured to expel the filling onto the dough on the flange, the nozzle including an outer periphery and a shoulder so structured as to catch a periphery portion of the dough between the shoulder and the flange, the outer periphery and the shoulder being so dimensioned as to squeeze the periphery portion of the dough into between an outer periphery of the nozzle and the pressure faces.

BEST MODE FOR CARRYING OUT THE INVENTION

Exemplary embodiments of the present invention will be described hereinafter with reference to the appended drawings.

A production device 1 is applicable to production of encrusted foods in that filling is encrusted with dough.

Figure 1:
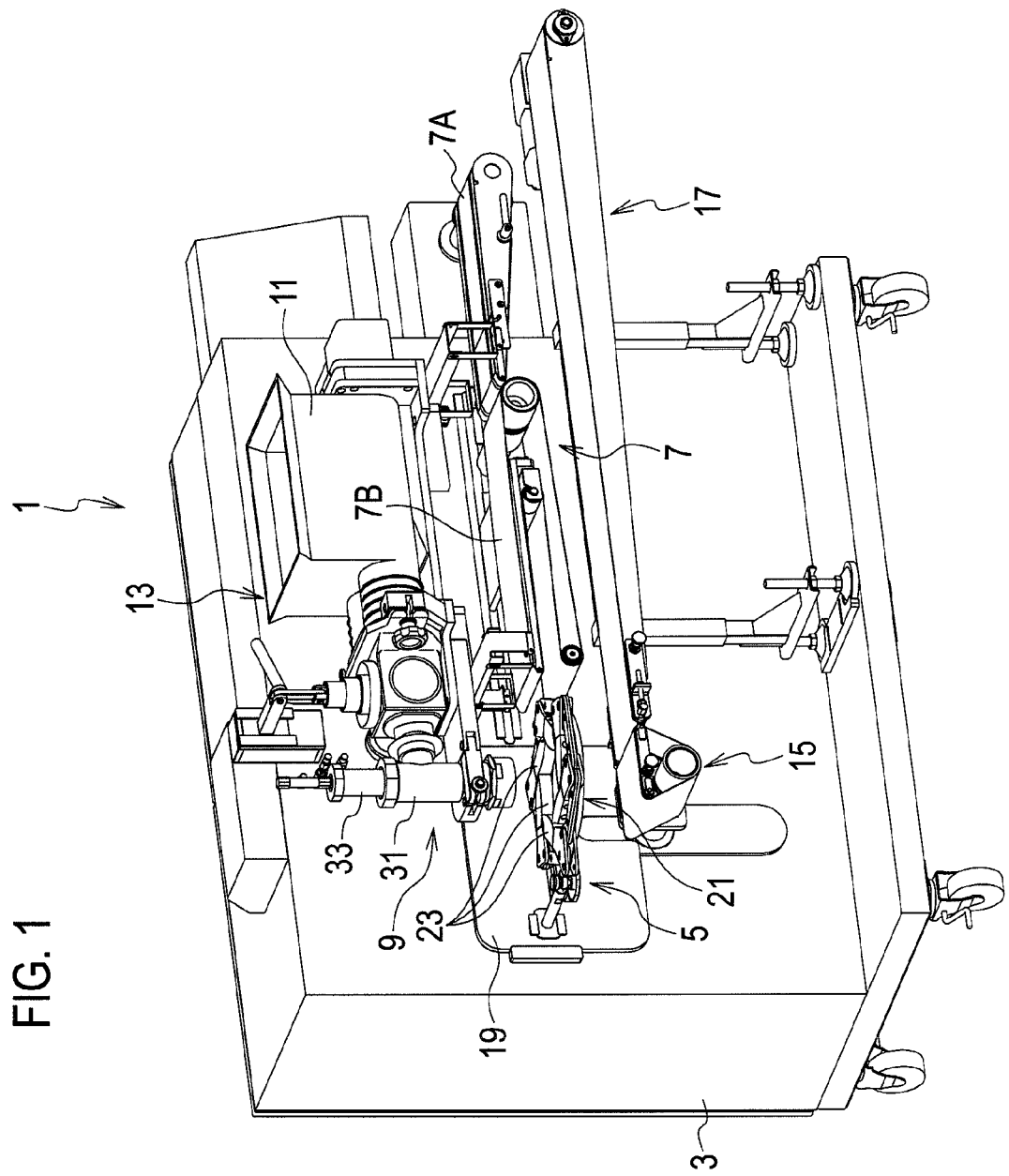
FIG. 1 is a perspective view of a production device for an encrusted food according to an embodiment of the present invention.
Figure 2:
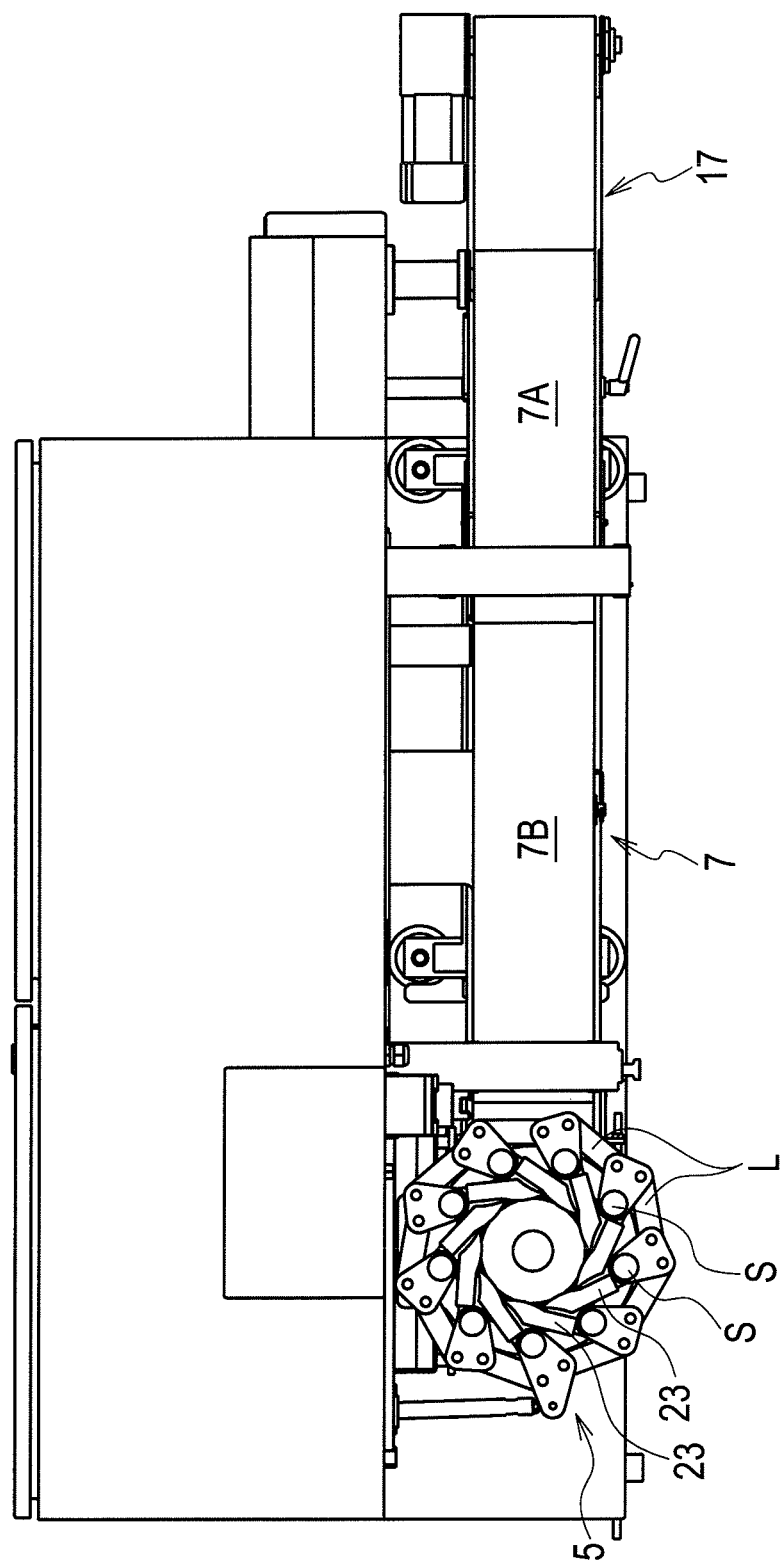
FIG. 2 is a plan view of the production device for an encrusted food according to the embodiment.

Referring to FIGS. 1, 2, the production device 1 is preferably comprised of a frame 3 and the following elements contained in the production device 1 are generally secured to, or movably supported by, the frame 3. The production device is comprised of a shutter device 5, a conveyor 7, a nozzle 9 for expelling filling onto the dough, a supporting device 15 for receiving encrusted foods, and a carrier 17 for carrying the encrusted foods out.

The shutter device 5 is supported by an elevator member 19 capable of going up and down as being driven by a proper actuator device, thereby being capable of going up and down. For the purpose of driving up and down, any known actuator means such as a hydraulic cylinder is applicable.

Figure 3A:
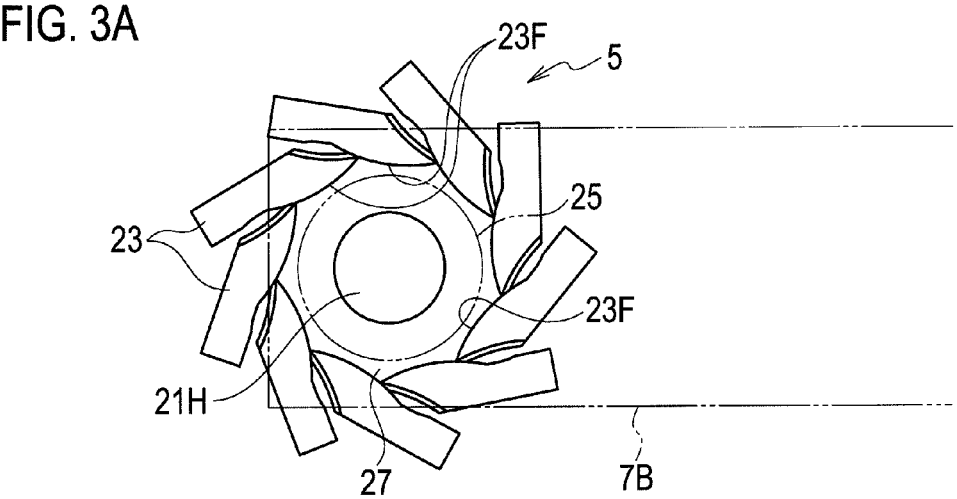
FIG. 3A is a plan view showing shutter pieces along with a flange supporting dough.
Figure 3B:
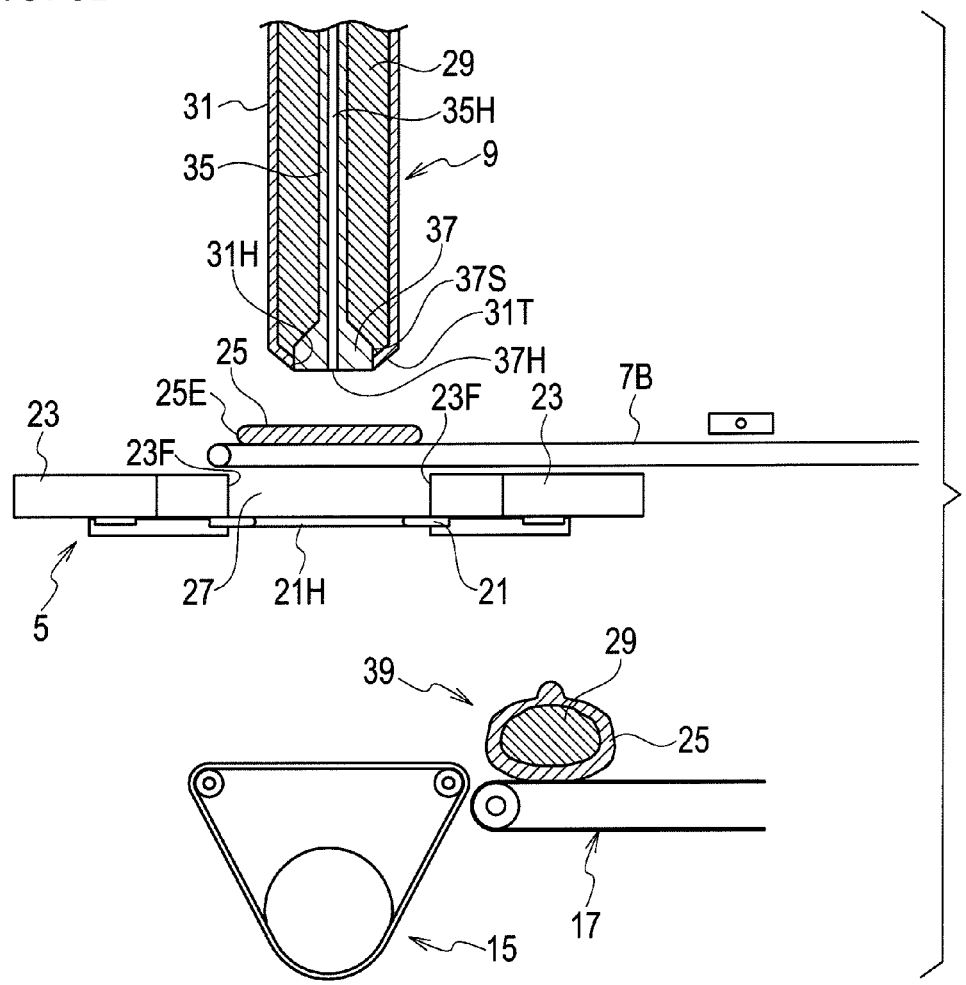
FIG. 3B is an elevational sectional view showing the shutter pieces and the flange along with a nozzle for expelling filling, which shows a state where a finished encrusted food is being taken out and a new piece of dough has been transported just above the flange.

Referring to FIGS. 3A and 3B in combination with FIGS. 1, 2, the shutter device 5 is comprised of a flange 21 for supporting dough 25.

On the flange 21, an opening 21H is opened at the center thereof and has a diameter so adapted that the dough 25 loaded with filling 29 sinks down into the opening 21H. The opening 21H is preferably circular but may be in any other shape.

The shutter device 5 is further comprised of a plurality of shutter pieces 23 arranged around the opening 21H so as to encircle the opening 21H. Preferably a circle along which the shutter pieces 23 are arranged is coaxial with the opening 21H.

The plurality of shutter pieces 23 is movably disposed on, and is in contact with, the flange 21. As being arranged around the opening 21H so as to encircle the opening 21H as described above, the shutter pieces 23 define a substantially circular region 27 and can make motion toward its center to narrow this encircled region 27. When in motion, the shutter pieces 23 keep in contact with and slide along the flange 21. More specifically, the shutter pieces 23, as making such motion, gather peripheries of the dough 25 placed on the flange 21 toward the center.

To make the shutter pieces 23 be movable, any proper structure is applied thereto. In an example shown in FIG. 2 for instance provided is a plurality of pivots S arranged along a circle around the opening 21H, by which the shutter pieces 23 are respectively pivotally supported. More specifically, the shutter pieces 23 respectively swing around the pivots S so that the encircled region 27 is narrowed.

The number of the shutter pieces 23 can be properly selected in light of the purpose of gathering the peripheries of the dough 25 and can be, for example, set to be three or more. In most of the appended drawings, the number of the shutter pieces 23 is nine but this number is no more than a convenience of explanation.

To set the plurality of shutter pieces 23 in motion synchronously, any proper linkage is applicable thereto. As shown in FIG. 2 for example, links L are applicable, by which the pivots S of the shutter pieces 23 are mutually linked. When rotating the links L, the plurality of shutter pieces 23 synchronously swings. When the links L clockwise rotate in the example shown in the drawings for instance, the plurality of shutter pieces 23 swings toward the center (then the encircled region is narrowed).

Any proper actuator means such as a pneumatic or hydraulic cylinder, a servomotor or a linear motor is applicable for the purpose of controllably driving the linkage. Further any proper control device such as a servo circuit is provided for the purpose of controlling the actuator means.

Instead of the links L mutually linking the pivots S, a polygonal frame connected with the plurality of pivots S is applicable. Alternatively any other linkages are also applicable and some of them will be illustrated later. Still alternatively, instead of the linkage, applicable is any proper structure such as a combination of the respective pivots S and actuator means such as servomotors respectively coupled with the pivots S.

Each shutter piece 23 is comprised of a main body of a quadrangle prism shape for example and a pressure face 23F constituted of a curved face. The pressure face 23F is a curved face close to a tip end of the shutter piece 23, which is adapted for pressing the dough 25. The pressure face 23F may be a vertical but may alternatively have any structure that is not vertical. Further, opposite to the pressure face 23F provided is a relief face. The relief face is formed in a properly concave curved face to allow swing motion of an adjacent shutter piece 23 when the shutter piece 23 in question swings.

When one shutter piece 23 swings, the adjacent shutter piece 23 synchronously swings, thereby all the shutter pieces synchronously swing. While it is explained in the aforementioned description that the links L connect all the shutter pieces 23, it may be modified so that any of the shutter pieces 23 is connected thereto and respective sliding motions render synchronous motion of all the shutter pieces 23. This structure by which the series of mutual sliding motion sets the whole into synchronous motion is a kind of the aforementioned linkage.

To the conveyor 7 applicable is a known conveyance means. In an example shown in FIGS. 1, 2 for instance, a first belt conveyor 7A and a second belt conveyor 7B are applied. Plural pieces of dough 25 respectively rolled out into a flat shape are laid on the first belt conveyor 7A and are one by one transported to the second belt conveyor 7B. The end of the second belt conveyor 7B is so structured as to be controllably extendable from a stand-by position shown in FIG. 7A to an advanced position shown in FIG. 3A for instance. The second belt conveyor 7B can therefore transport the dough 25 transported from the first conveyor 7A onto the flange 21 (in the region encircled by the plurality of shutter pieces 23 and just under the nozzle 9) under control, and, on the other hand, does not disturb operation of the nozzle 9 and the shutter device 5 by moving backward. Of course instead of the belt conveyors, robot arms, levitation devices, or any known conveyor means may be applied thereto.

The conveyor 7 may be comprised of optical sensors or CCD cameras for the purpose of measuring diameters of the pieces of dough or for any other purposes. The optical sensors or CCD cameras may be provided at locations that get bird'-eye views of any locations on the conveyor 7.

Referring back to FIGS. 1,2, to the nozzle 9 connected is a feeder device 13 comprised of a hopper 11. The feeder device 13, for example, has a rotary pump or such built therein, so as to fill the nozzle 9 with the filling 29 fed from the hopper 11 under controlled pressure. Alternatively instead of, or in addition to, the rotary pump, any proper pressurizing means such as a pneumatic cylinder can be used. While the nozzle 9 is secured to the frame 3, it may be alternatively made vertically movable.

Figure 6:
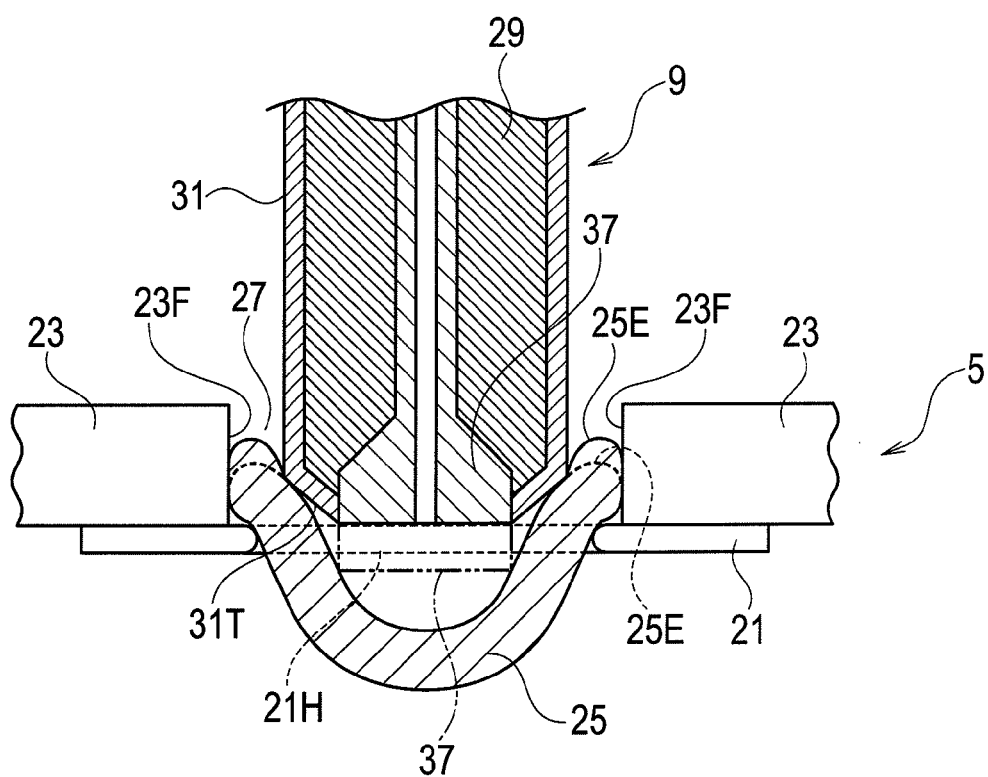
FIG. 6 is an elevational sectional view of the shutter pieces, the flange and the nozzle, which shows a state where the shutters and the flange get elevated toward the nozzle.

Referring to FIG. 3B for example, the nozzle 9 is comprised of a nozzle main body 31 generally of a hollow cylinder and having an opening 31H at its tip end, and a valve member 37 for closing the opening 31H. The nozzle main body 31 is so dimensioned as to, when the shutter pieces 23 move toward the center, leave a proper gap between an outer periphery of the nozzle main body 31 and the pressure faces 23F as shown in FIG. 6. Or, motions of the shutter pieces 23 are controlled to leave the proper gap.

Referring back to FIG. 3B, at the neighborhood of the tip end of the nozzle main body 31 formed is a shoulder portion 31T adapted for pressing the dough 25 outward. The shoulder portion 31T is a tapered face tapering toward the tip end of the nozzle main body 31 for example but may be formed in any proper distinct shape. The hollow in the nozzle main body 31 is a space through which the filling 29 passes, and the filling 29 fed from the feeder device 13 is first filled in the hollow of the nozzle main body 31 and there stands by for expulsion.

The valve member 37 is supported by a plunger 35 passing through the hollow of the nozzle 31. The plunger 35 is connected with an actuator 33 driven by hydraulic or pneumatic pressure at its upper end, and is thereby made to move up and down.

As the valve member 37 is pressed down by the plunger 35, an outer face 37S thereof comes into close fit within the opening 31H. More specifically, whether the nozzle 9 is opened or closed is controlled by whether the valve member 37 goes up or down. Or, depending on viscosity or a grain size of the filling 29, closure of the nozzle 9 may occur without close fit. Preferably the diameter of the opening 31H is regulated so that the nozzle 9 is substantially closed at least when the valve member 37 comes down and then a lower face 37L thereof becomes flush with a lower edge of the opening 31H. The valve member 37 may further go beyond the lower edge of the opening 31H to project downward as drawn with a two-dot chain line in FIG. 6.

The valve member 37 is preferably, to prevent adhesion of the filling 29, made of any proper material such as any fluoropolymer, and its lower face can be a horizontal flat face. Further to prevent adhesion of the filling 29, it is advantageous to reduce area of the lower face, and it may be processed with a proper surface treatment.

Preferably the valve member 37 is comprised of a through hole 35H in spatial communication with the interior of the plunger 35. Further the plunger 35 is connected with an air source such as a compressor provided outside.

The supporting device 15 is vertically movable independently from the shutter device 5. Any known actuator means such as a pneumatic cylinder or a hydraulic cylinder is applicable for the purpose of upward and downward actuation. The supporting device 15 has a proper structure for gently receiving the dough 25 loaded with the filling 29. The supporting device 15 is for example an elastic body forming a closed loop as shown in FIG. 3B, and may be so constructed as to carry encrusted foods 39 out to the carrier 17 by means of operation of rollers.

To the carrier 17 applicable is any known transporting means such as a belt conveyor, a robot arm, or a levitation device. By means of the carrier 17, completed encrusted foods 39 are taken out of the device.

Referring mainly to FIG. 3A through FIG. 11B, encrusted foods 39 are produced in a way as described below. In the meantime, a plurality of encrusted foods 39 are sequentially and continuously produced by repeating the following steps and therefore it should not be understood that any of the steps described below is an initial or final step.

Referring to FIG. 3A for example, the plurality of shutter pieces 23 is at an instant directed outward (the encircled region is widened), the second belt conveyor 7B is at an advanced position, and the dough 25 thereon is positioned just above the flange 21. Referring to FIG. 3B, the supporting device 15 is at a lowered position and an encrusted food 39 completed in advance has been transferred to the carrier 17.

Figure 4:
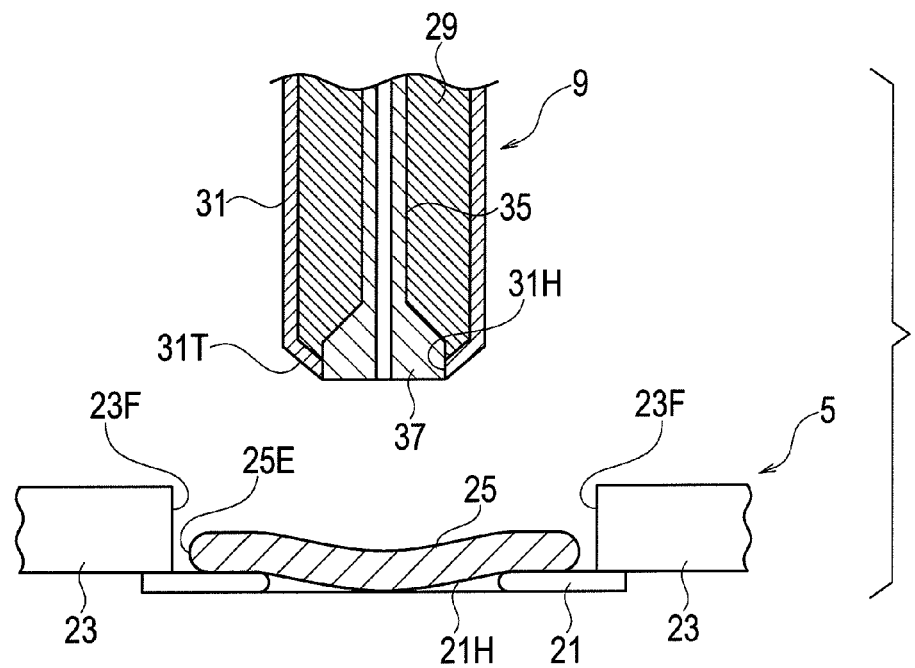
FIG. 4 is an elevational sectional view of the shutter pieces, the flange and the nozzle, which shows a state where the dough is placed on the flange.

The second belt conveyor 7B is next made to go back and then the dough 25 falls down onto the flange 21 as shown in FIG. 4. Then the supporting device 15 is elevated in preparation for supporting the dough 25.

Figure 5:
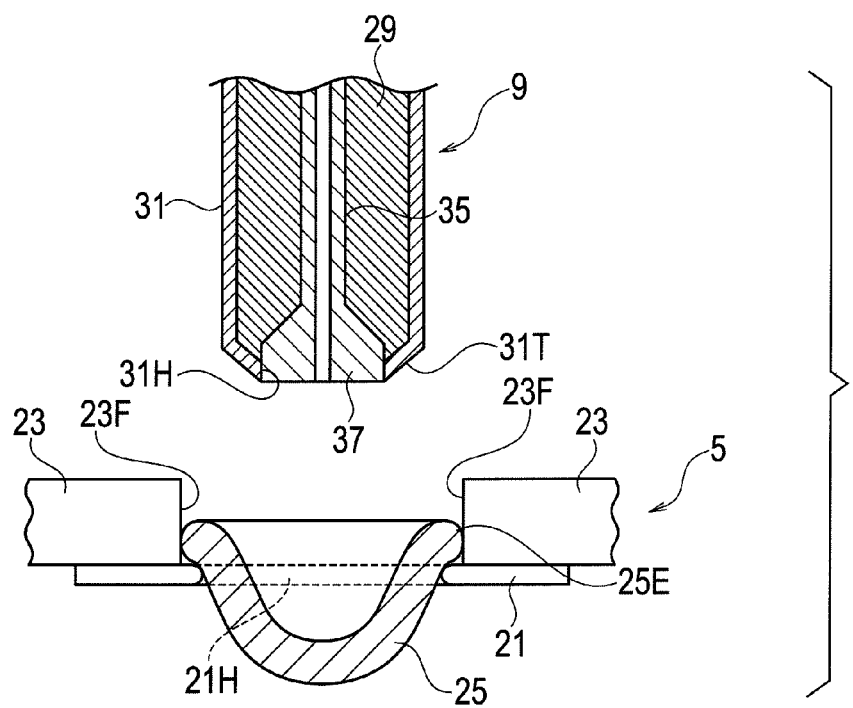
FIG. 5 is an elevational sectional view of the shutter pieces, the flange and the nozzle, which shows a state where the shutter pieces have swung toward the center until they have gotten in contact with a periphery portion of the dough.

Next as shown in FIG. 5, as the plurality of shutter pieces 23 is made to synchronously swing toward the center (the encircled region is narrowed), the pressure faces 23F of the shutter pieces 23 get in contact with the periphery portion 25E of the dough 25. As being further pressed by the pressure faces 23F, and as its own weight acts thereon, the center and its surroundings of the dough 25 sink down into the opening 21H.

A degree to which the pressure faces 23F press the periphery portion 25E determines proportion of the dough 25 which sinks down into the opening 21H and more specifically determines proportion of the dough 25 left on the flange 21. Although details will be described later, the portion left on the flange 21 will be in general a sealing portion 25A of the crust of the encrusted food 39. To leave a controlled portion in the dough 25 on the flange 21, motions of the shutter pieces 23 are properly controlled, thereby adjusting the sealing portion 25A to a desired size.

In the following description, the periphery portion 25E is in general defined as the portion left on the flange 21 by the aforementioned step.

As the shutter device 5 and the supporting device 15 are elevated (or as the nozzle 9 is made to go down), the dough 25 gets in contact with the tip end of the nozzle 9 as shown in FIG. 6. Then the periphery portion 25E is caught between the shoulder portion 31T and the flange 21.

As the shoulder portion 31T is formed in a shape adapted for pressing the periphery portion 25E outward as described above, the periphery portion 25E is squeezed radially outward and then rises along the pressure faces 23F, thereby being squeezed into a gap between the pressure faces 23F and the nozzle main body 31. The periphery portion 25E is made to be thinner than the original thickness of the dough 25. This is advantageous in reducing the sealing portion 25A in size. As the dough may harden if it comes to be overly thin, to prevent this situation, the relative height of the nozzle 9 may be properly regulated.

In this step, the shutter pieces 23 are made to move slightly inward so as to direct the periphery portion 25E upward, or the gap between the pressure faces 23F and the nozzle main body 31 is regulated. This promotes the function of squeezing the periphery portion 25E into the gap, or regulates the thickness of the periphery portion 25E. Therefore this is advantageous in forming a smaller sealing portion 25A.

Figure 7A:
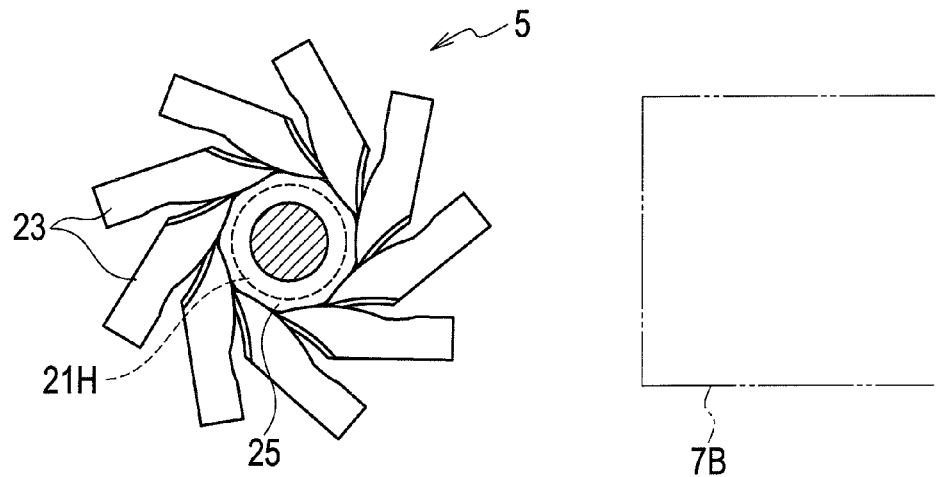
FIG. 7A is a plan view showing the shutter pieces along with the flange, which shows a state where the filling is placed on the dough.
Figure 7B:
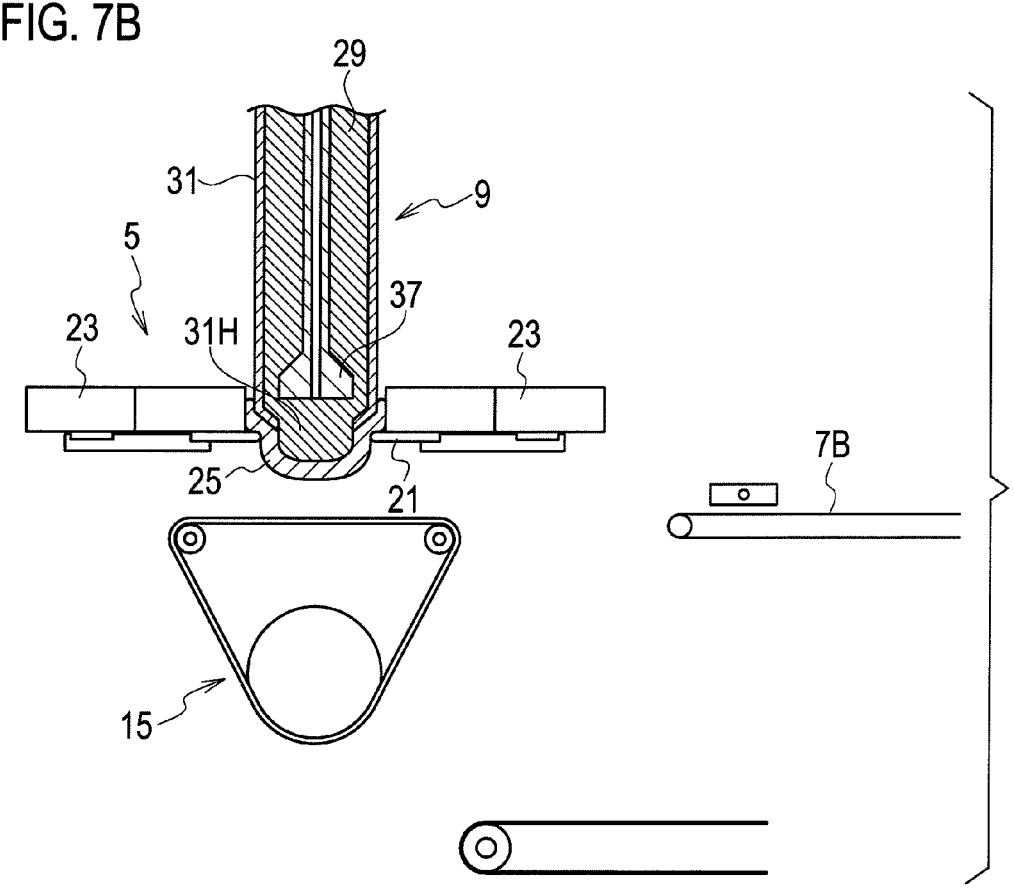
FIG. 7B is an elevational sectional view of the shutter pieces, the flange and the nozzle, which shows a state where the filling is being expelled through the nozzle onto the dough.

Further referring to FIGS. 7A, 7B, the plunger 35 sets the valve member 37 at an elevated position, and the filling 29 is given pressure by the feeder device 13 and is thereby expelled onto the dough 25. The amount of the filling 29 is properly regulated by means of the feeder device 13. The supporting device 15 then, as described above, gets elevated to a position adapted for supporting the dough 25.

Figure 8A:
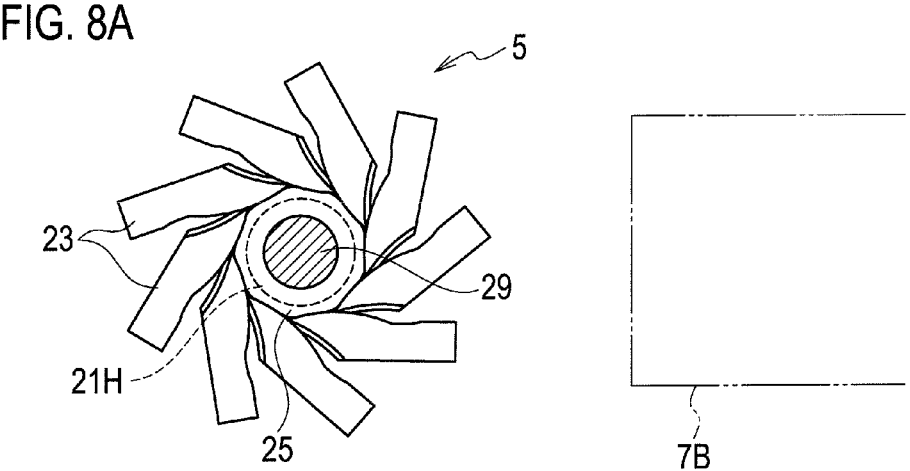
FIG. 8A is a plan view showing the shutter pieces along with the flange, which shows a state where the dough loaded with the filling sinks down into the opening.
Figure 8B:
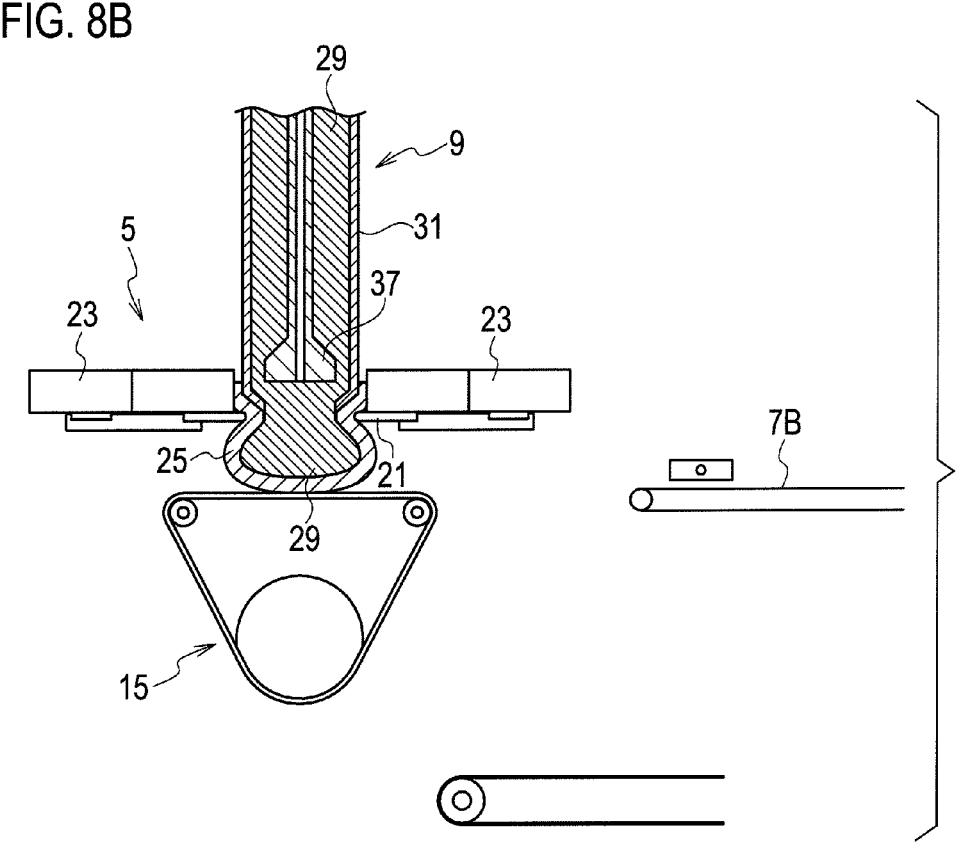
FIG. 8B is an elevational sectional view of the shutter pieces, the flange and the nozzle, which shows a state where a valve member comes down so as to stuff the filling into the dough.

Further referring to FIGS. 8A, 8B, the filling 29 is expelled out and its weight makes the dough 25 further bulge downward. Then the dough 25 loaded with the filling 29 is supported from its lower side by the supporting device 15. The plunger 35 next lets the valve member 37 down, thereby stuffing the dough 25 with a controlled amount of filling 29. Because the tip end of the nozzle 9 then keeps in contact with the dough 25, the filling 29 will not spill out.

In this process, as the lower face of the dough 25 is supported by the supporting device 15, the part at issue hardly extends and therefore keeps its original thickness. As being stuffed with the filling 29, the dough 25 bulges radially. Thus mainly a portion ranging from its side to the periphery portion 25E is drawn out and made slightly thinner. Alternatively, during this process, the supporting device 15 may be made to gradually go down so as to regulate the degree of radial bulging.

Figure 9A:
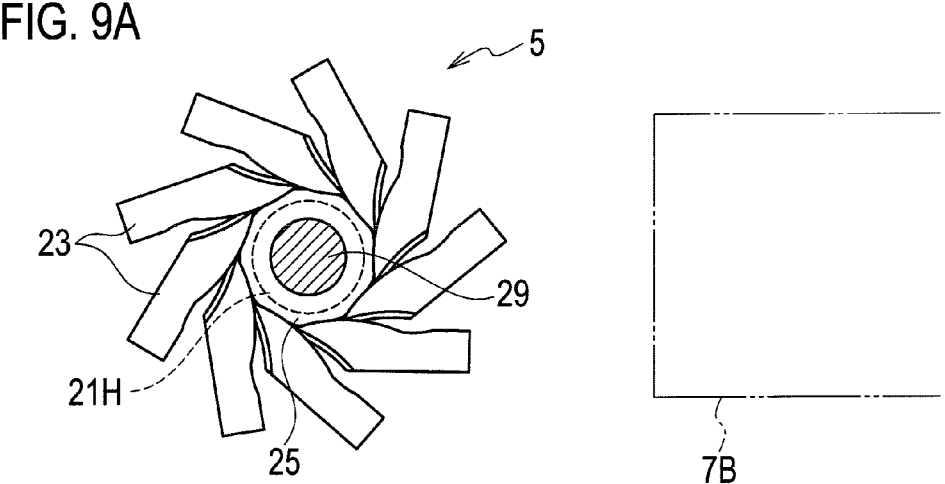
FIG. 9A is a plan view showing the shutter pieces along with the flange, which shows a state where the dough loaded with the filling sinks down into the opening.
Figure 9B:
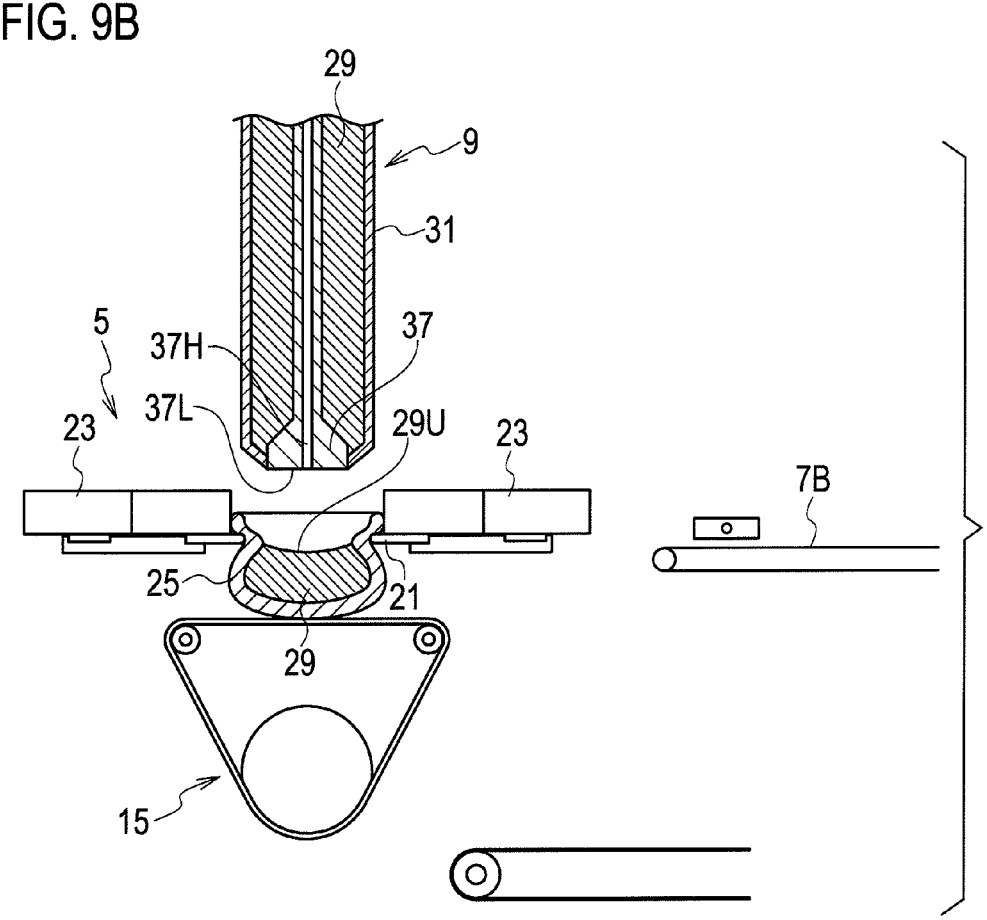
FIG. 9B is an elevational sectional view of the shutter pieces, the flange and the nozzle, which shows a state where the shutters and the flange come down and the nozzle is detached from the filling.

Referring to FIGS. 9A, 9B, the height of an upper face 29U of the filling 29 is defined by a lower face 37L of the valve member 37, and next the shutter device 5 and the supporting device 15 are made to go down together (or, the nozzle 9 is elevated). Therefore the nozzle 9 is detached from the filling 29 on the dough 25. The valve member 37 may be then elevated as well. If doing so, inertial force acts on the filling 29 and on the other hand the valve member 37 gets elevated, thereby promoting separation of the filling 29 from the valve member 37. Shearing motion of the valve member 37 relative to the nozzle main body 31 also promotes separation of the filling 29. Further it may be executed to inject air through the through hole 35H. These actions are advantageous in preventing adhesion of the filling 29 to the valve member 37.

Figure 10A:
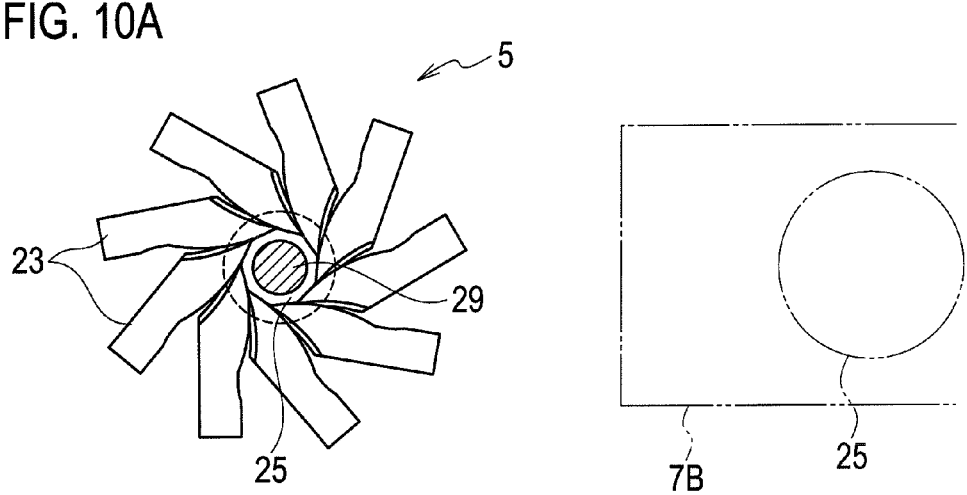
FIG. 10A is a plan view showing the shutter pieces along with the flange, which shows a state where the shutter pieces have further swung toward the center.
Figure 10B:
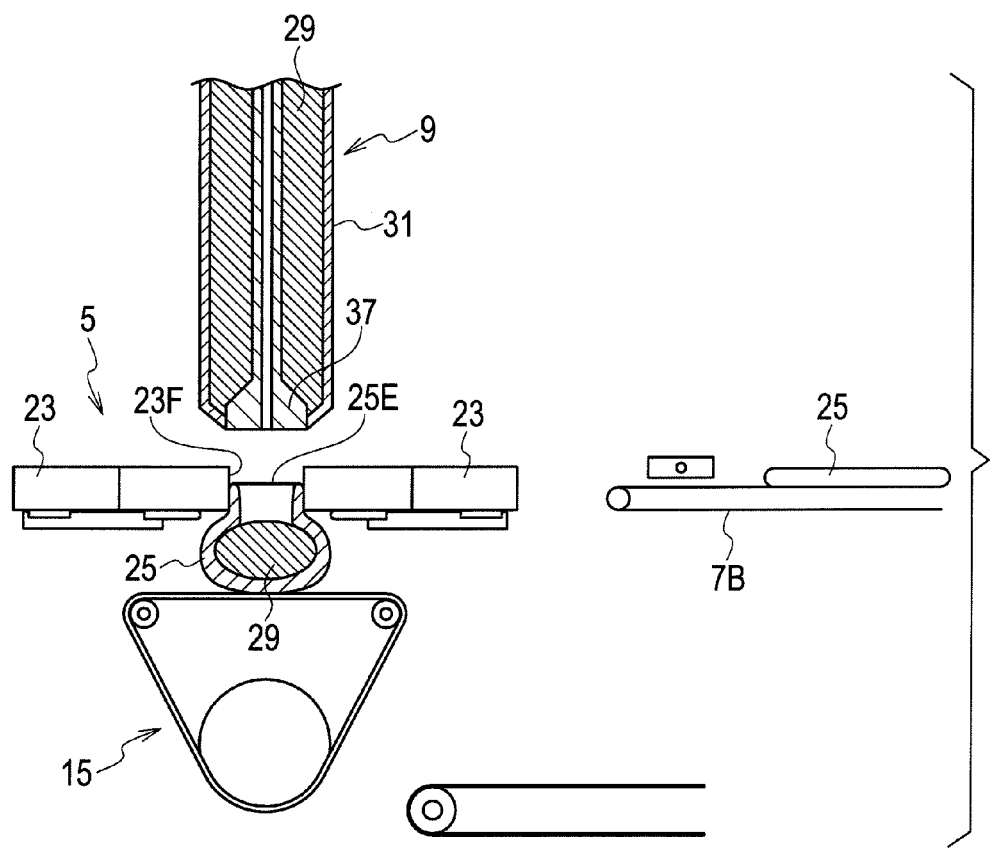
FIG. 10B is an elevational sectional view of the shutter pieces, the flange and the nozzle, which shows a state where the shutter pieces have further swung toward the center.

The plurality of shutter pieces 23 has so far kept the state shown in FIGS. 6A, 6B and is now made to synchronously swing toward the center (the encircled region is narrowed) again as shown in FIGS. 10A, 10B. The portion of the periphery portion 25E of the dough 25 caught between the shoulder portion 31T and the flange 21 is gathered toward the center by the shutter pieces 23. On this occasion, the periphery portion 25E leaning against the flange 21 and the pressure faces 23F is pulled up by the pressure faces 23F and subsequently falls down toward the center, thereby being gathered.

The height of the upper face 29U of the filling 29 has been in advance defined by the lower face 37L of the valve member 37 and is lower than that of the periphery portion 25E of the dough 25 during gathering. Thus there is no concern that the filling 29 spills out during this process. Preferably the shutter device 5 and the supporting device 15 keep to go down.

Figure 11A:
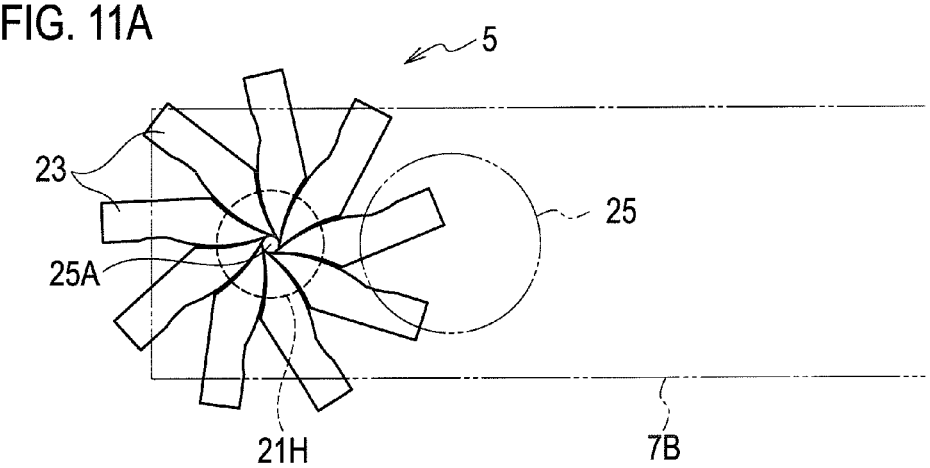
FIG. 11A is a plan view showing the shutter pieces along with the flange, which shows a state where the periphery portion of the dough is gathered by the shutter pieces.
Figure 11B:
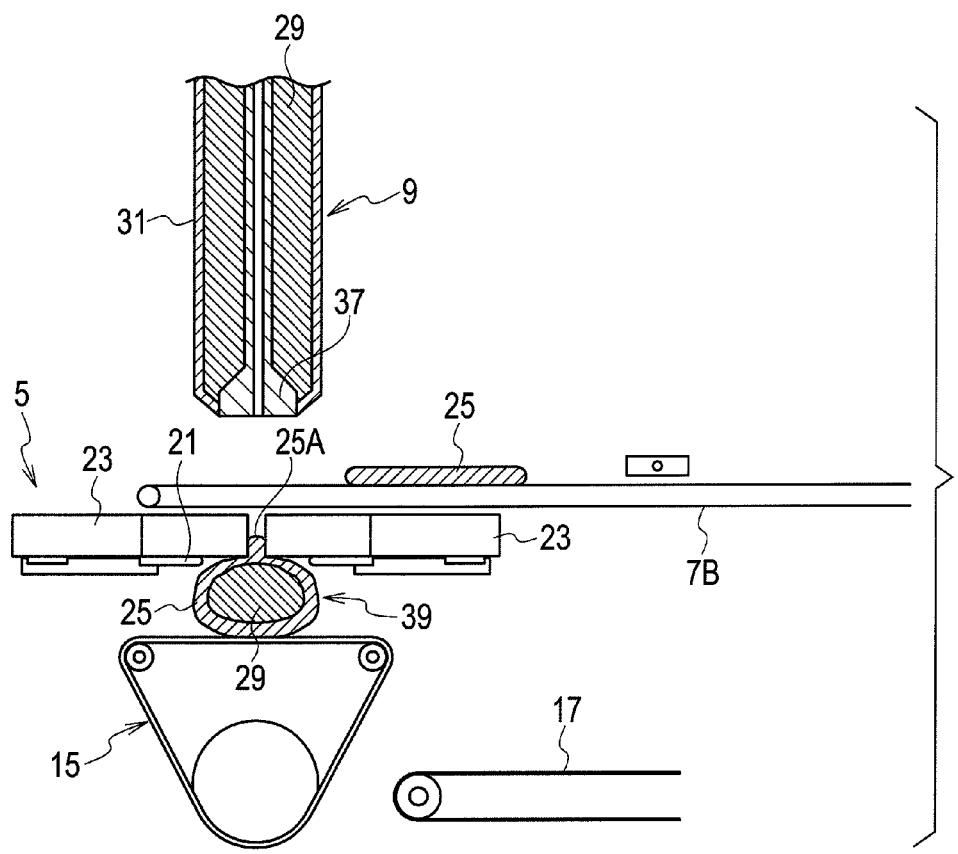
FIG. 11B is an elevational sectional view of the shutter pieces, the flange and the nozzle, which shows a state where the periphery portion of the dough is gathered by the shutter pieces.

By further making the shutter pieces 23 swing, the periphery portion 25E of the dough 25 is thoroughly gathered as shown in FIGS. 11A, 11B, and is press-bonded at the sealing portion 25A. The filling 29 is in this way covered with the dough 25 and then an encrusted food 39 is finished up. Then the second conveyor 7B is driven to transport next dough 25 onto the flange 21.

The shutter pieces 23 are made to swing in reverse directions to release the dough 25 and the supporting device 15 loaded with the encrusted food 39 further goes down. The supporting device 15 transfers the encrusted food 39 to the carrier 17 and the encrusted food 39 is carried out by the carrier 17. In parallel, a next piece of dough 25 reaches the flange 21 and thus the state returns to that shown in FIGS. 3A, 3B.

Meanwhile, while the aforementioned description has stated that the supporting device 15 stays at a position where the device 15 immediately supports the dough 25 bulging downward, the supporting device 15 may stay more distant therefrom. Any place where the device 15 prevents the dough 25 from falling off is enough.

As being understood from the above description, the periphery portion 25E of the dough 25 is caught between the shoulder portion 31T and the flange 21 and simultaneously bulging and gathering of the dough 25 occur. Therefore portions closer to the periphery portion 25E tend to extend greater. As being gathered after thickness reduction, the upper portion of the crust does not come to be thick, and may be rather made thinner. Further the original size of the dough 25 can be reduced in prospect of subsequent extension. This is advantageous in light of economy of foodstuffs.

Further as being understood from the above description, the portion of the dough 25 left on the flange 21 (the periphery portion 25E) is a portion caught between the nozzle and the flange 21, from which the sealing portion 25A originates. The quantity of the portion of the dough 25 left on the flange 21 is properly regulated by the quantity of motion of the shutter pieces 23 and further this portion is made thinner by being nipped. Therefore the sealing portion 25A can be, as compared with those by the prior art, made narrower and smaller. This is advantageous in view of aesthetic quality, texture, eating quality and economy of foodstuffs.

Figure 12:
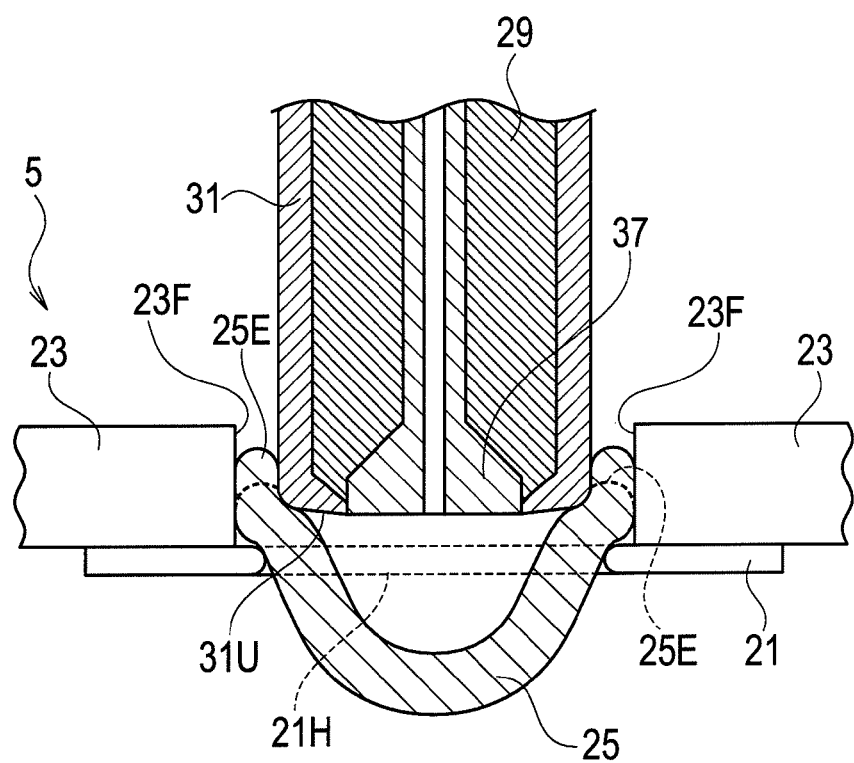
FIG. 12 is an elevational sectional view of the shutter pieces, the flange and the nozzle, which shows a state where the shutters and the flange get elevated toward the nozzle.

In the nozzle 9, the shoulder portion 31U may have a flat lower end as shown in FIG. 12. Even by this shape, the dough 25 is pressed radially outward whereas production of the nozzle 9 is made easier.

As described above, various modifications will occur in regard to the linkage for setting the shutter pieces in synchronous motion. Instead of swing for example, translational motion may be applied as described below.

Figure 13:
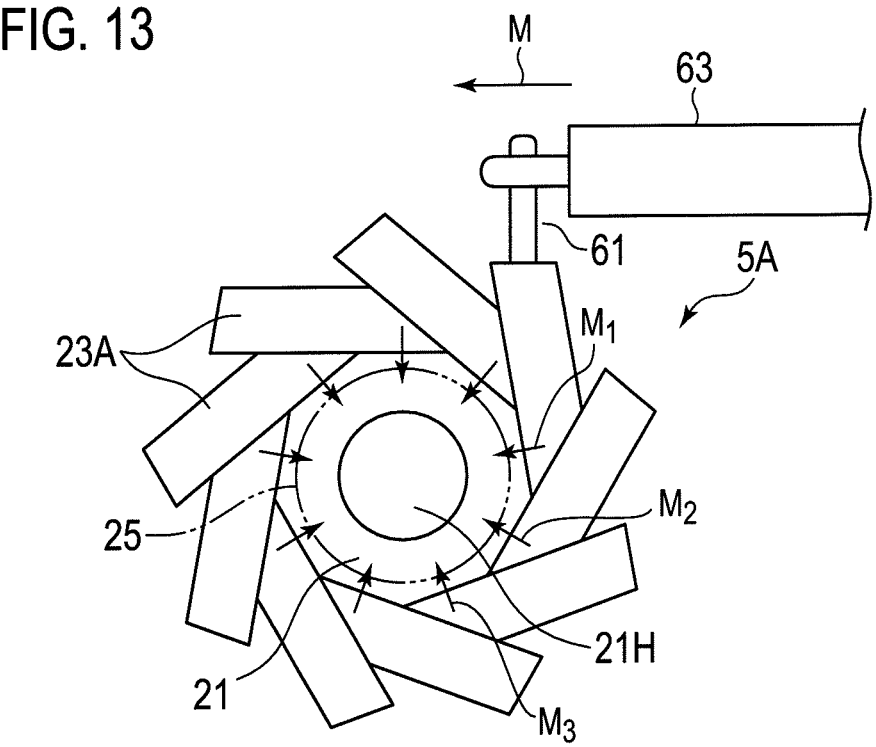
FIG. 13 is a plan view showing an example in that linear motion makes the shutter pieces move toward the center.

Referring to FIG. 13, each shutter piece 23A is in general rectangular and one end thereof is obliquely cut off to form a relief face. A plurality of shutter pieces 23A is so combined that a relief face of one shutter piece 23A is in contact with a relief face of another shutter piece 23A. In order to retain contact between each relief face and each pressure face, any proper coupling member may be added. The plurality of shutter pieces 23A is thereby combined together to encircle the center, and is mutually bound so that each relief face and each pressure face are mutually in slidable contact.

A plunger 61 is provided on one end of any of the shutter pieces 23A and is driven like as an arrow M by a cylinder 63. Then the shutter piece 23A in question gets in motion like as an arrow M1 and its pressure face gets closer to the center. As the pressure face is obliquely in contact with the relief face of the adjacent shutter piece 23A, the adjacent shutter piece 23A follows the motion of the shutter piece 23A in question to get in motion like as an arrow M2. This shutter piece 23A further forces an adjacent shutter piece 23A toward an arrow M3. As such following motions sequentially occur, the plurality of shutter pieces 23A get in synchronous motion, thereby respective pressure faces move toward the center (or get away from the center).

Figure 14:
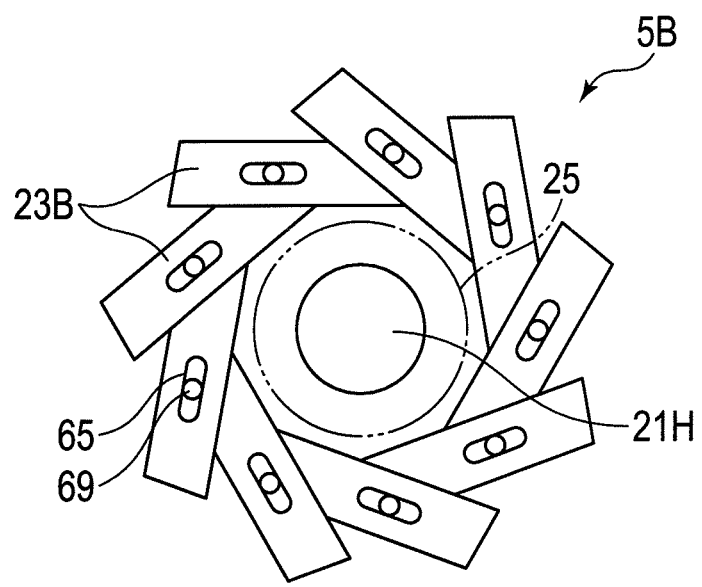
FIG. 14 is a plan view of a plurality of shutter pieces according to another modified embodiment.
Figure 15:
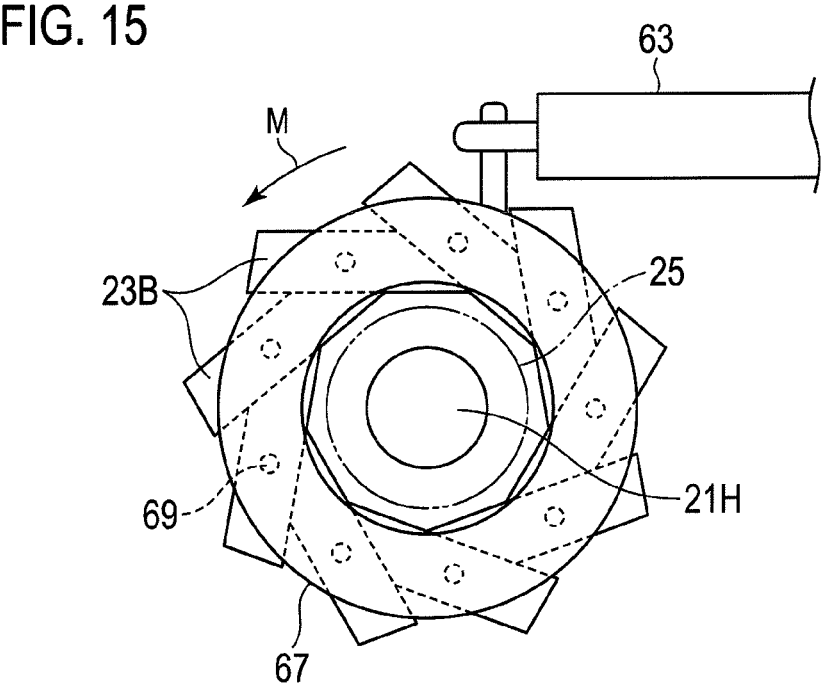
FIG. 15 is a plan view showing a state where a ring with a driving shaft is made to fit in slots of the shutter pieces.
Figure 16:
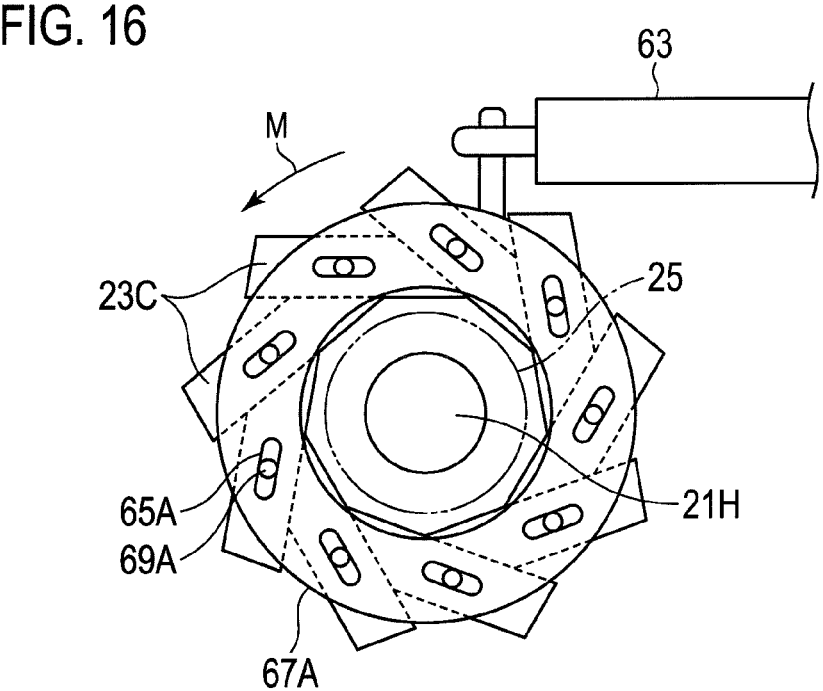
FIG. 16 is a plan view of shutter pieces and a ring according to the other modified embodiment, which should be compared with FIG. 15.

Alternatively, a modification as shown in FIG. 14 will occur. Each shutter piece 23B has a structure similar to that of any of the aforementioned embodiments and is further comprised of a slot 65 slidably fitting with a pin 69. A ring 67 having a plurality of pins 69 arranged along its circumference is as shown in FIG. 15 made to fit therewith. When the ring 67 is made to rotate as illustrated by an arrow M (or opposite thereto) around its center, the shutter pieces 23B synchronously get in motion, thereby respective pressure faces move toward the center (or get away from the center). Alternatively, as shown in FIG. 16, shutter pieces 23C may respectively have pins 69A and instead a ring 67A may have slots 65A.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

A production device and a production method which enable reduction in size of a sealing portion projecting from a top portion of a crust of an encrusted food are provided.

The invention claimed is:

1. A method for producing an encrusted food in which filling is encrusted with dough, the method comprising:
   providing a shutter comprising a flange and a plurality of shutter pieces,
   the plurality of shutter pieces being provided on the flange so as to encircle an opening of the flange, each of the shutter pieces having a face that faces the opening;
   transporting the dough onto the flange;
   driving the shutter pieces synchronously to press the faces on a periphery portion of the dough so as to make the dough sink down into the opening and leave a controlled portion of the dough on the flange;
   pressing the dough on the flange against a nozzle so as to catch the periphery portion of the dough between the flange and a shoulder of the nozzle and squeeze the periphery portion of the dough into a gap between an outer periphery of the nozzle and the faces;
   expelling the filling through the nozzle onto the dough on the flange to bulge the dough out of the opening;
   distancing the dough from the nozzle; and
   collecting the periphery portion in a direction towards the opening via the faces.

2. The method of claim 1, further comprising:
   controlling motion of the shutter pieces to leave the gap between the outer periphery of the nozzle and the faces.

3. The method of claim 1, further comprising:
   setting the shutter pieces in motion to press the faces against the periphery portion of the dough so as to direct the periphery portion caught between the flange and the shoulder of the nozzle upward.

4. The method of claim 1, further comprising:
   controlling motion of the shutter pieces so as to make a width of the gap narrower than an original thickness of the dough.

\* \* \* \* \*